… … … …

United States Patent [19]

Joyce, Jr. et al.

[11] Patent Number: 5,182,050

[45] Date of Patent: Jan. 26, 1993

[54] EXTRINSICALLY/INTRINSICALLY CONDUCTIVE GEL

[75] Inventors: James L. Joyce, Jr.; Warren C. Jones, both of Winston-Salem; John R. Rowlette, Sr., Clemmons; David F. MacInnes, Jr., Greensboro; Navin N. Vyas, Winston-Salem, all of N.C.

[73] Assignee: AMP Incorporated, Harrisburg, Pa.

[21] Appl. No.: 782,831

[22] Filed: Oct. 24, 1991

[51] Int. Cl.$^5$ .............................................. H01B 1/00
[52] U.S. Cl. ................................... 252/500; 252/502; 252/503; 252/510; 252/511; 252/512
[58] Field of Search ............... 252/500, 502, 503, 511, 252/513, 514, 518; 106/287.13, 287.16

[56] References Cited

U.S. PATENT DOCUMENTS

| | | | |
|---|---|---|---|
| 4,559,112 | 12/1985 | Tamamura et al. | 428/421 |
| 4,770,641 | 9/1988 | Rowlette | 439/86 |
| 4,772,421 | 9/1988 | Ikenaga et al. | 252/518 |
| 4,845,457 | 7/1989 | Nakanishi | 338/114 |

Primary Examiner—Brian E. Hearn
Assistant Examiner—Mark Kopec
Attorney, Agent, or Firm—William B. Noll

[57] ABSTRACT

This invention is directed to an electrically conductive gel comprising an extrinsically conductive gel having dispersed therein a quantity of an intrinsically conductive polymer, where said polymer is present in the amount of between about 0.03 to 1.6%, by weight. Preferred conductive polymers are those selected from the class of polypyrrole, polyaniline, polyanisidine, polythiophene, and derivatives of these base polymers.

4 Claims, 1 Drawing Sheet

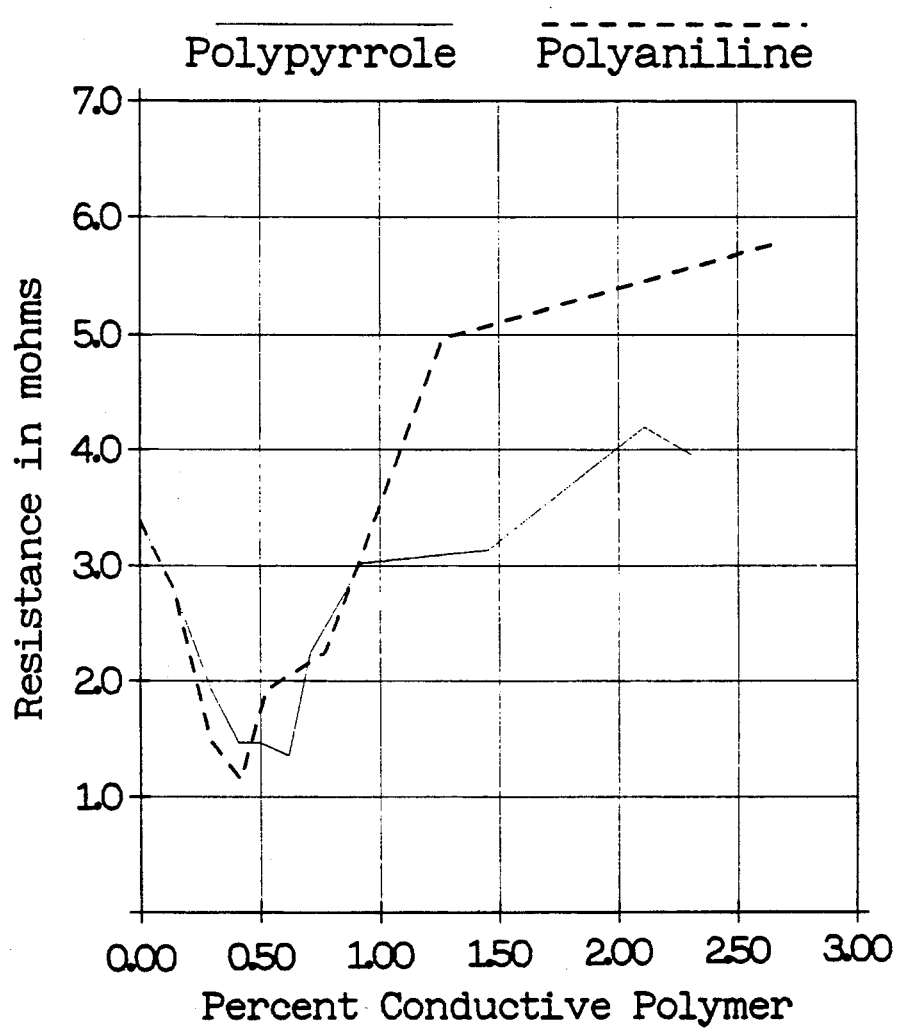

EXTRINSICALLY/INTRINSICALLY CONDUCTIVE GEL

BACKGROUND OF THE INVENTION

The present invention is directed to a new electrically conductive gel composition, where said composition consists of an extrinsically conductive gel, such as a silicone gel having dispersed therein fine particles of a conductive material, and a small quantity of an intrinsically conductive polymer. In such composition, the addition of the normally lesser conductive intrinsically conductive polymer to the extrinsically conductive polymer significantly increases the electrical conductivity of the conductive gel mixture (blend).

Extrinsically conductive gels are well-known in the art, as exemplified by U.S. Pat. Nos. 4,845,457 and 4,770,641. The best known, and most extensively used, are silicone gels. Properly formulated silicone gels offer a number of advantages over other types of polymeric conductive compositions, such as conductive epoxies and thermoplastic adhesives. Some attributes thereof are the ability to be used in an open ended cavity of a housing, for example, to provide electrical interconnection to conductors in contact therewith. That is, silicone gels can be formulated to be non-flowable, yet be self-healing when connected or disconnected to a conductor. One such silicone gel is a dielectric two-component transparent silicone encapsulant specifically designed to seal, protect, and preserve the electrical characteristics of electrical components embedded therein and marketed under the trademark Sylgard 527 by Dow Corning Corporation. Sylgard is a registered trademark of Dow Corning Corporation. When the two components of this material are mixed in a one-to-one ratio, the consequent cured material forms a cushioning, self-healing, resilient gel-like mass.

In such a state, the silicone gel is not conductive. As a consequence, conductive particles are dispersed therein, hence the designation, extrinsically conductive gel.

The conductive particles dispersed within the gelatinous medium to form a conductive gel can comprise any of a number of conventionally available conductive particles. For example, silver-coated nickel particles or silver-coated glass particles could each be advantageously employed in this invention. Solid silver spheres or silver flakes might also be employed.

Since such particles must be uniformly dispersed and retained in the gel during curing, it may be desirable to select a particle having a specific gravity as near as possible to that of the gel. Further, in order to form a fully conductive gel, the concentration of the conductive particles in the gel must be at least equal to or above the percolation threshold. The percolation threshold is the lower limit of the volumetric concentration of randomly distributed conductive particles within a dielectric medium which would result in bulk conductivity. The conductivity threshold is generally on the order of 20 to 25% by volume of conductive particles in a dielectric medium. The upper limit, depending on the use thereof may be as high as 60% by volume. As the loading by particles increases, certain of the desirable attributes of a gel are diminished.

In contrast to the extrinsically conductive polymer materials, i.e. filled gels, which are rendered conductive by the inclusion of conductive particles, there is another class of polymeric materials which are intrinsically conductive. Such materials, typically organic polymers, can be made electrically conductive without the addition of metal or other conductive fillers. Intrinsically electrically conductive polymers combine the property of electrical conduction commonly found in metals with the processing and resistance to chemical attack advantages of polymeric materials thereby providing a versatile material suitable for use in many applications.

Certain of such polymers are made electrically conductive by a process known as doping. This doping may be accomplished by chemical methods or electrochemical methods. Appropriate polymers may be treated with an oxidizing agent such as iodine, sodium peroxydisulfate or bromine (either as a gas or in solution) or a strong acid for a desired time to give partially oxidized materials that are electrically conductive. Conversely, appropriate types of polymers may be treated with a reducing agent to give partially reduced materials that are electrically conductive. Methods for doping are known in the art and include chemical oxidation and/or reduction and electrochemical oxidation and/or reduction. Some materials such as polyaniline, one of the preferred materials herein, can be doped by using a strong acid in combination with an oxidizing agent to give electrically conductive materials. A typical level of conductivity for a mass of conductive polyaniline is about $1 \times 10^{-4}$ to $1 \times 10^3$ S/cm. It is to be understood that the converse of conductivity is resistivity. That is, conductivity increases with decreasing resistivity.

Intrinsically conductive polymers have certain limits that restrict their use in practical applications. Specifically, their practical applications have been limited because of unsuitable physical properties such as brittleness, lack of flexibility, lack of abrasion resistance, insolubility of the polymer in its conducting state, and decomposition of the polymer before softening.

The present invention, by the combination of the intrinsically conductive polymer with an extrinsically conductive gel, discovered a way to utilize the conducting properties of the intrinsically conductive polymer for practical applications. BRIEF SUMMARY OF INVENTION This invention is directed to an electrically conductive gel composition, where said gel comprises an extrinsically conductive silicone gel having dispersed therein a quantity of an intrinsically conductive polymer, where said polymer is present in the amount of between 0.1 to 1.6%, by weight.

A preferred intrincically conductive polymer is one selected from the group consisting of polypyrrole, polyaniline, polyanisidine, polythiophene, and derivatives of these base polymers.

BRIEF DESCRIPTION OF DRAWING

The FIGURE is a graph illustrating the change in electrical resistance with increasing additions of polypyrrole and polyaniline, intrinsically conductive polymers, to an extrinsically conductive silicone gel.

DETAILED DESCRIPTION OF PREFERRED EMBODIMENTS

This invention relates to a new electrically conductive gel composition for use in electrical interconnection devices of the type disclosed in U.S. Pat. No. 4,770,641 to Rowlette. The preferred composition consists of an extrinsically conductive gel, such as a silicone gel having dispersed therein fine particles of a conductive material, and a small quantity of an intrinsically conductive polymer.

Extrinsically conductive silicone gels under optimum loading conditions, exhibit a typical electrical resistance on the order of 2-20 millohms. Polyaniline, one of the preferred intrinsically conductive polymers for use in this invention, is from 10 to 100 times less conductive, i.e. greater resistance, than the metal conductors used in a conductive silicone gel.

During research to develop an improved conductive gel formulation, it was discovered that fractional additions of an intrinsically conductive polymer, such as polypyrrole or polyaniline, dispersed within the gel in the form of powder, could lower the resistance of the gel by a factor of four. This surprising and unexpected phenomenon is clearly illustrated by the Figure. The data to develop the plots of said Figure were derived from a series of gel formulations prepared in the following manner, then subjected to the insertion of an electrical four-point probe to measure the electrical resistance through the gel.

SAMPLE PREPARATION

Polyaniline (PANI)

1. Approximately 12 g of ammonium peroxydisulfate ($(NH_4)_2S_2O_8$) were dissolved in 200 mL of 1 M HCl which had been cooled to less than 5° C.
2. Approximately 20 mL of aniline ($C_6H_5NH_2$) were dissolved in 300 mL of 1 M HCl which had been cooled to less than 5° C., then maintained in an ice bath to keep the temperature below 5° C.
3. The two solutions were then mixed with the ammonium peroxydisulfate being added dropwise to the aniline solution over 1 to 2 hours with continuous stirring. The temperature was maintained at less than 5° C. during this step.
4. The mixture resulted in the formation of a dark green/black solid precipitate of polyaniline, where the solution had a dark green/black color.
5. The mixture was then stirred for a total of 3 hours, then allowed to warm to approximately 20° C. At this point, the solution was vacuum filtered and the filtrate (solid polyaniline) was subsequently washed with approximately 1000 mL of 1 M HCl. The filtrate was then dried under vacuum overnight. To confirm the presence of polyaniline, an ultraviolet-visible (UV-VIS) spectrum was taken of the material which was dissolved in dimethylformamide (DMF).

Polypyrrole (PPYR)

1. Approximately 27 g of iron trichloride ($FeCl_3$) were dissolved in 500 mL of distilled water.
2. Approximately 5 mL of pyrrole were dissolved in 500 mL of distilled water.
3. The two solutions were then mixed with the iron trichloride solution (oxidizer) being added dropwise to the pyrrole solution over 1 to 2 hours with continuous stirring. The solution was stirred for a total of 3 hours. This was all done at room temperature.
4. A solid precipitate of polypyrrole formed almost immediately and gave the solution a dark black color.
5. Thereafter the mixture was vacuum filtered and the filtrate (solid polypyrrole) washed with 100 mL of distilled water, then vacuum dried overnight.

To prepare the PANI or PPYR for inclusion with the conductive gel mixture, it was necessary to subject the dried filtrate to a grinding operation. Specifically, a few grams of the conductive polymer were placed into a small rock tumbler with 25 g using 0.2 to 0.5 cm diameter nickel shot as the grinding media. Thereafter, the tumbler was angled at 30° to normal and allowed to run for between 2 and 24 hours. The particle size of the ground conductive polymer was in the range of 1 to 25 $\mu$m.

Conductive Gel Blend

1. Approximately 10 g of P-157 silicone (rom Silicone Inc.) and approximately 0.4 g of P-157B curing agent (from Silicone Inc.) and approximately 0.07 g of P-157C catalyst (from Silicone Inc.) were added to a 25 m plastic beaker to form a resin.
2. Approximately 2.8 to 7.0 g of silver flake, SF-350 (from Hardy & Harman) and approximately 11.0 g of silver plated mica (or glass) (from Potters Industries) were then added to the resin.
3. The mixture was stirred for 5-7 minutes at 1300 rpm with an overhead 4-pronged stirrer blade.

To develop the data for the Figure the PANI or PPYR was blended with the Conductive Gel mixture. To effect the blending thereof, a small quantity (0.01 g-2.0 g) of the crushed conductive polymer particles were then added to the mixture and this blend stirred for about 5-7 minutes at 1300 rpm. Thereafter, the new formulation was cured in a convection oven for about 30 minutes at approximately 150° C. After such curing, samples of the blend containing different amounts of the conductive polymer particles were measured with a Loresta 4-point probe conductivity meter. With no addition of the conductive polymer particles, the resistance was on the order of about 3.50 milliohms. However, quite surprisingly, the resistance dropped significantly with as little as about 0.04%, by weight, PPYR, or about 0.4%, by weight, PANI. Thus, improved conductivity can be achieved in an extrinsically conductive gel by the addition of about 0.03 to 1.6%, by weight, of an intrinsically conductive polymer.

We claim:
1. An electrically conductive gel comprising an extrinsically conductive silicone gel having dispersed therein a quantity of an intrinsically conductive polymer selected from the group consisting of polypyrrole, polyaniline, polyanisidine, polythiopene, and derivatives thereof, said polymer being present in the amount of between about 0.03 to 1.6%, by weight.
2. The electrically conductive gel according to claim 1 containing from 20% to 50%, by volume, of carbon, metal or metal coated fine particles, where said particles are uniformly dispersed therein.
3. The electrically conductive gel according to claim 1 wherein said intrinsically conductive polymer is polypyrrole present in the amount of from about 0.03 to 0.50%, by weight.
4. The electrically conductive gel according to claim 1 wherein said intrinsically conductive polymer is polyaniline present in the amount of from about 0.25 to 1.50%, by weight.

* * * * *